(12) United States Patent
Ulrich et al.

(10) Patent No.: US 7,551,351 B2
(45) Date of Patent: Jun. 23, 2009

(54) MICROSCOPE WITH EVANESCENT SAMPLE ILLUMINATION

(75) Inventors: Heinrich Ulrich, Heidelberg (DE); Werner Knebel, Kronau (DE); Kyra Moellmann, Trippstadt (DE); Peter Euteneuer, Lahnau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/415,413

(22) Filed: May 1, 2006

(65) Prior Publication Data

US 2006/0250690 A1 Nov. 9, 2006

Related U.S. Application Data

(63) Continuation of application No. PCT/EP2004/052285, filed on Sep. 23, 2004.

(30) Foreign Application Priority Data

Sep. 25, 2003 (DE) ............................. 103 44 410
Sep. 10, 2004 (DE) ....................... 10 2004 044 307

(51) Int. Cl.
*G02B 21/06* (2006.01)
*G02B 21/00* (2006.01)
(52) U.S. Cl. ..................... 359/388; 359/368; 359/385
(58) Field of Classification Search ......... 359/368–390, 359/618
See application file for complete search history.

(56) References Cited

U.S. PATENT DOCUMENTS

| 6,094,300 | A | 7/2000 | Kashima et al. | 359/385 |
| 6,160,662 | A * | 12/2000 | Uchida et al. | 359/390 |
| 6,504,653 | B2 | 1/2003 | Matthae et al. | 359/656 |
| 6,987,609 | B2 | 1/2006 | Tischer et al. | 359/385 |
| 7,042,638 | B2 | 5/2006 | Gonschor et al. | 359/385 |
| 7,187,494 | B2 * | 3/2007 | Nishiwaki et al. | 359/388 |
| 2002/0020800 | A1 * | 2/2002 | Knebel et al. | 250/201.3 |
| 2002/0097489 | A1 | 7/2002 | Kawano et al. | 359/388 |
| 2004/0001253 | A1 | 1/2004 | Abe et al. | 359/388 |
| 2004/0196549 | A1 * | 10/2004 | Aono | 359/388 |

FOREIGN PATENT DOCUMENTS

| DE | 100 39 520 A | 2/2002 | |
| DE | 101 43 481 A | 3/2003 | |
| DE | 102 17 098 A1 | 11/2003 | |
| DE | 102 29 935 A1 | 1/2004 | |
| DE | 101 08 796 A1 | 9/2005 | |
| JP | 2003-29153 | * 1/2003 | 359/385 |
| JP | 2004-85811 | * 3/2004 | 359/385 |

OTHER PUBLICATIONS

English translation of the Japanese reference No. 2003-29153.*
Clapp A. R. et al. 3-dimensional optical trapping and evanescent wave light scattering for direct measurement of long range forces . . . Review of Scientific Instruments, Jun. 1999, pp. 2627-2629, vol. 70 No. 6 American Institute of Physics US.
Tokunaga M. et al. Single molecule imaging of fluorophores and enzymatic reactions . . . Biochemical and Biophysical Research Communications, 1997, pp. 47-53, vol. 235, Academic Press., Inc US.
Ishijima A. et al. Single molecule nanobioscience. Tibs Trends in Biochemical Sciences, Jul. 2001, pp. 438-444, vol. 26, No. 7, Elsevier Publication, England.

* cited by examiner

*Primary Examiner*—Thong Nguyen
(74) *Attorney, Agent, or Firm*—Houston Eliseeva LLP

(57) ABSTRACT

A microscope with evanescent sample illumination comprises a device for optically manipulating a sample.

14 Claims, 4 Drawing Sheets

MICROSCOPE WITH EVANESCENT SAMPLE ILLUMINATION

RELATED APPLICATIONS

This application is a Continuation of PCT application serial number PCT/EP04/52285 filed on Sep. 23, 2004 which in turn claims priority to German application serial number DE 103 44 410.6 filed on Sep. 25, 2003 and German application serial number DE 10 2004 044 307.6 filed on Sep. 10, 2004, both of which are incorporated herein by reference in their entirety.

FIELD OF THE INVENTION

The invention relates to a microscope with evanescent sample illumination.

BACKGROUND OF THE INVENTION

A microscope with evanescent illumination of a sample is known from US 2002/0097489 A1. The microscope comprises a white light source, the light of which is coupled for the purpose of evanescent illumination via a slit aperture through the microscope objective onto a sample holder, which holds a sample. The illumination light propagates itself in the sample holder by means of total internal reflection, whereby the illumination of the sample occurs only in the region of the evanescent field that protrudes from the sample holder. Microscopes of this type are known as "total internal reflection fluorescent microscopes" (TIRFM).

The z-resolution of TIRF microscopes is extraordinarily good because the evanescent field protrudes only about 100 nm into the sample.

A high-aperture objective specifically for TIRF application is known from DE 101 08 796 A1. The objective comprises a first lens with positive refractive power and a second lens with negative refractive power, whereby the focal distance ratio between the two lenses is in the −0.4 and −0.1 range, and the total refractive power is greater than zero. The objective further comprises two positive lenses, the diameter ratio to focal length of which is greater than 0.3 and less than 0.6. The objective further comprises a negative lens and a collecting lens, whereby the negative lens faces the front group, and the focal distance ratio of the negative lens to the collector lens is between −0.5 and −2.

An incident illumination device for TIRF microscopy is known from DE 102 17 098 A1. The incident illumination device comprises an illumination source that emits a polarized illumination beam when in operation, which propagates at an angle to the optical axis and a deflector that deflects the illumination light beam and couples it parallel to the optical axis in the objective. Provision is made in this incident illumination device for the illumination light beam emitted by the illumination source to exhibit a phase difference in the s- and p-polarization directions, and for the deflection arrangement to reflect the illumination light beam x times, whereby $x=(n\times 180°-d)/60°$.

A microscope for total internal reflection microscopy (TIRM) is known from DE 101 43 481 A1. The microscope exhibits a microscope housing and an objective. The illumination light emitted by an illumination device can be coupled via an adapter that can be inserted into the microscope housing.

A microscope with an optical illumination system that enables simple switching between evanescent illumination and reflective illumination is known from US 2004/0001253 A1. The illumination system comprises a laser light source, the light of which is coupled in an optical fiber. Furthermore an outcoupling optic is provided that focuses the light that exits from the fiber onto a rear focal point of the microscope objective. The optical fiber is movable along a plane that is perpendicular to the optical axis of the microscope objective.

A device for coupling light in a microscope is known from DE 102 29 935 A1. Here, a laser light is directed onto a sample in the illuminated field diaphragm plane by a laser light fiber coupling, which is implemented as a slide. The invention is particularly suitable for the TIRF method.

In scanning microscopy, a sample is illuminated with a light beam to observe the detection light emitted by the sample as reflection or fluorescent light. The focus of an illumination light beam is moved on an object plane with the help of a movable beam deflector, generally by tipping two mirrors, whereby the axes of deflection are usually positioned perpendicular to each other, so that one mirror deflects in the x-direction and the other in the y-direction. The mirrors are tipped with the help, for example, of galvanometric positioners. The power of the light coming from the object is measured dependent on the position of the scanning beam. Generally, the positioners are provided with sensors to determine the actual position of the minors. In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a beam splitter, a beam deflector to control the beam, a microscope optic, a detection aperture, and detectors to detect the detection light or fluorescent light. The illumination light is coupled via a beam splitter. The fluorescent light or reflected light emitted by the object returns to the beam splitter via the beam deflector, passes through it, and is subsequently focused onto the detection aperture, behind which are located the detectors. This arrangement of detectors is called a descan arrangement. Detection light that does not originate directly from the focal region takes another light path and does not pass through the detection aperture so that pixel information is obtained, which is converted into a three-dimensional image by sequential scanning of the object with the focus of the illumination light beam. A 3-dimensional image is generally achieved by layered imaging.

A confocal scanning microscope that enables simultaneous manipulation and object detection is known from DE 100 39 520 A1. In this scanning microscope as well, two beam deflectors—one for the manipulation light beam and one for the illumination light beam—are provided. In a particular embodiment of this scanning microscope, coupling of the manipulation light beam in the beam path of the illumination light beam occurs via the deflecting mirror located in the illumination light beam. The deflecting mirror is implemented such that it is transparent to light at the wavelength of the manipulation light beam and reflective of light at the wavelength of the illumination light beam.

A laser scanning microscope with at least two light sources and two beam deflectors is known from U.S. Pat. No. 6,094,300. Each of these light sources is allocated a beam deflector. The laser light beams emitted by the light sources can scan the sample independently of each other with both beam deflectors.

SUMMARY OF THE INVENTION

It is the task of the present invention to disclose a microscope that enables the spectrum of applicable sample testing methods to be expanded in a very flexible manner.

This task is solved by a microscope wherein the microscope exhibits a device for optically manipulating the sample.

Preferably, the device for optically manipulating the sample exhibits an adjustable beam deflector. In one embodiment of the invention, the beam deflector comprises at least one galvanometric mirror. The beam deflector may also comprise at least one rotatable or tiltable prism and/or at least one wing mirror and/or a micromirror and/or an acousto-optical component.

Preferably, the microscope additionally exhibits the device for optically manipulating the sample.

In a preferred embodiment, the device for optically manipulating the sample exhibits at least one the light source that emits a manipulation light beam. The light source preferably comprises at least one laser.

The device for optically manipulating the sample preferably comprises at least one optic for forming and/or directing the beam.

In a very particularly preferred variant, the device for optically manipulating the sample is implemented as a module that may be coupled to and uncoupled from a microscope stand. In this variant, the device for optically manipulating a sample preferably exhibits a housing with an outcoupling port that may be coupled to the coupling port of a microscope. The module is preferably implemented such that it enables retrofitting of already existing microscopes.

The light source preferably emits an illumination light beam for evanescently illuminating a sample. Alternatively or additionally, a further light source may be provided that emits an illumination light beam for evanescently illuminating a sample. The further light source is directly coupled to the microscope stand in a preferred variant; it may also be a component of the device for optically manipulating the sample, or of an already existent microscope that is to be retrofitted.

In a particularly preferred embodiment of the microscope according to the invention, the illumination light beam exhibits a focus in the area of the pupil plane of the objective. It has been recognized according to the invention, that the penetration depth of an evanescent illumination field in a sample is dependent on the angle at which total reflection at the cover glass interface or at the sample holder interface occurs. This angle is directly correlated with the angle relative to the optical axis at which the illumination light beam that is provided for evanescent sample illumination exits from the objective via the front lens. This angle is, in turn, dependent upon the distance from the optical axis at which the illumination light beam passes through the rear focal plane of the objective (pupil). In order to have available a largely parallel illumination light beam for the purpose of evanescent sample illumination, the illumination light beam must exhibit a focus in the rear focal plane of the objective. Finally, the distance of the focus to the optical axis of the objective determines the aforementioned angle, and therewith the penetration depth of the evanescent field in the sample to be tested.

According to the invention, the distance of the focus of the illumination light beam to the optical axis of the objective is adjustable whereby the distance is preferably adjustable with the beam deflector and/or the further beam deflector.

Preferably, the manipulation light beam exhibits a focus in the area of the sample.

In one embodiment of the invention, a compensating optic may be inserted into the beam path of the microscope to produce a focus of the illumination light beam that is positioned in the area of the pupil plane, and which is removable to produce a focus of the manipulation light beam in the area of the sample.

In a further embodiment of the invention, a compensating optic may be inserted in the beam path of the microscope to produce a focus of the manipulation light beam in the area of the sample, and which is removable to produce a focus of the illumination light beam in the area of the pupil plane.

In the simplest case, the compensating optic is a lens or a deflection path around the lens, consisting of several (preferably four) deflecting mirrors.

In one embodiment, it is provided that the beam deflector deflects the manipulation light beam and/or the illumination light beam. In another variant, a further adjustable beam deflector is provided that deflects the illumination light beam and/or the manipulation light beam.

The microscope preferably comprises a scanning microscope, in particular a confocal scanning microscope. The device for optically manipulating the sample may be expanded such that it may be used as a confocal scanner. Additional components that may be implemented with this variant include, in particular, a dichroic beam splitter, a detection pinhole, and a detector.

The microscope according to the invention preferably comprises a detector that may for example, be implemented as a camera.

The microscope according to the invention is particularly suitable for FRAP testing (fluorescence recovery, after photo bleaching) and/or for FRET testing (Förster transfer) of a sample. The manipulation light beam may in particular be used to release a marker (caged compound release) and/or for bleaching and/or for activating a marker and/or for microdissection.

BRIEF DESCRIPTION OF THE DRAWINGS

The object of the invention is schematically represented in the diagram, and is described below on the basis of figures, wherein elements that have the same function are given the same reference numbers. They show.

DETAILED DESCRIPTION OF THE PREFERRED EMBODIMENTS

Figure 1:
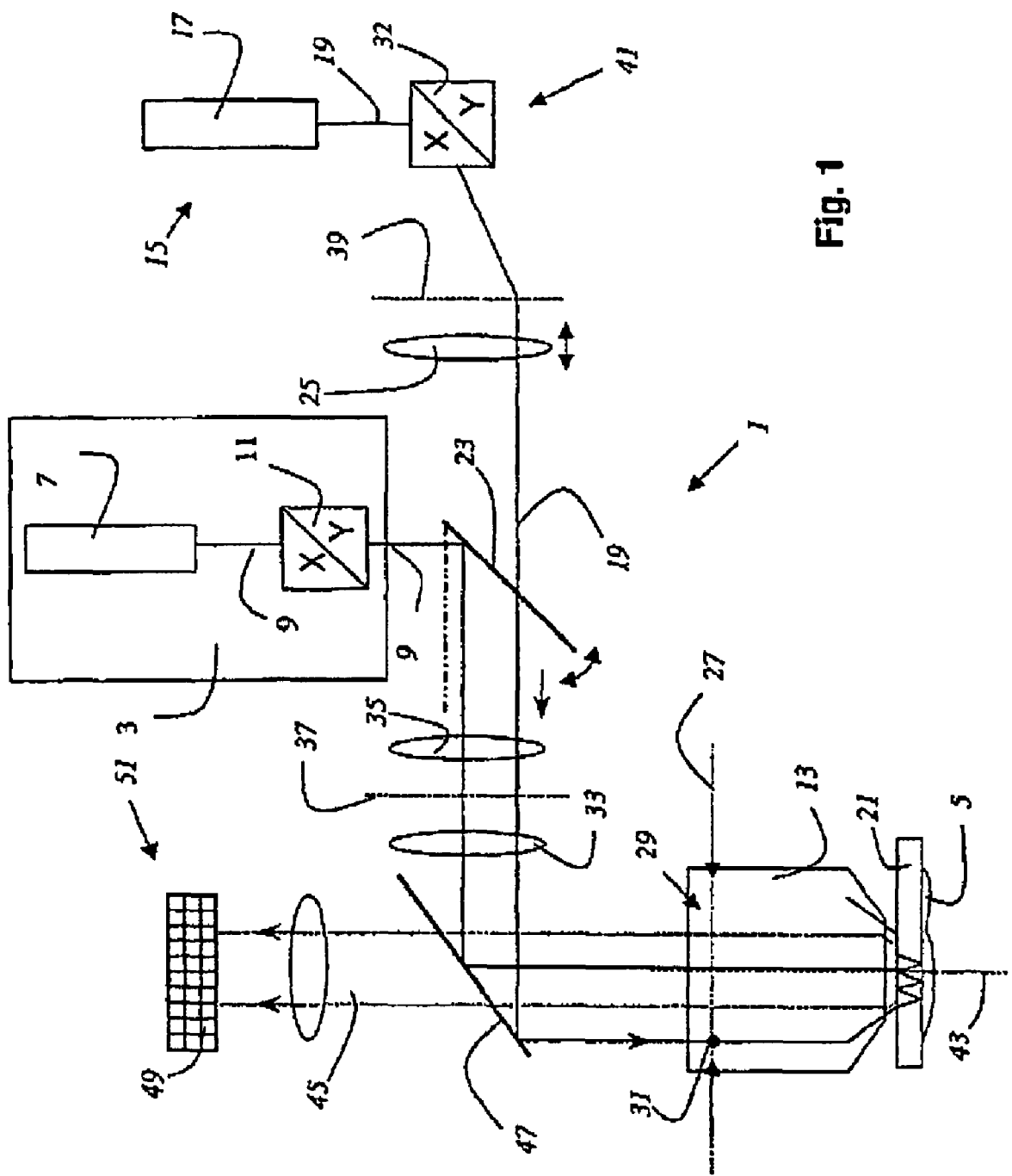
FIG. 1 is a schematic illustration of a microscope according to the invention.

FIG. 1 shows a microscope 1 according to the invention, with an optical device 3 for manipulating a sample 5. The optical device 3 comprises a light source 7 that emits a manipulation light beam 9, and an adjustable beam deflector 11. The microscope 1 comprises an objective 13 and a further light source 15 that is implemented as a laser 17, and which produces an illumination light beam 19. The illumination light beam 19 that is emitted from the further light source 15, serves to evanescently illuminate the sample 5, which is positioned on a sample holder 21. In order to achieve evanescent sample illumination, the wing mirror 23 is tipped in the position indicated by the broken lines. By so doing, the beam path is cleared for the illumination light beam 19. A compensating optic 25 is provided in the beam path of the illumination light beam 19 to compensate for unevennesses in the objective pupil plane 27. The compensating optic 25 also enables compensation for different pupil positions of different objectives 13. For this purpose, the compensating optic 25 is implemented so as to be axially movable. The illumination light beam 19 exhibits a focus 31, which is indicated by a point, in the plane 27 of the objective pupil 29, and which may be varied in its position in the plane 27 of the objective pupil 29 with the help of the further adjustable beam deflector 32.

Several optical elements for directing and forming the beam are arranged in the beam path of the microscope 1. There may, for example, be a first optic 33, a second optic 35, and an optic 25. which produce a first intermediate image plane 37 and a second intermediate image plane 39. The adjustable further beam deflector 32 comprises a cardanically suspended rotating mirror 41, which is not shown. The distance of the Focus 31 to the optical axis 43 of the objective 13 may be adjusted and therewith the penetration depth of the illumination light beam in the sample 5 varied with the help of the further adjustable beam deflector 32. The detection light 45 exiting from the sample 5 passes through the objective 13 as well as through the beam splitter 47, which directs the illumination light beam 19 through the objective 13 and through the tube optic to a detector 49, which is implemented as a CCD camera 51. The beam splitter 47 is implemented as a dichroic beam splitter, and is designed such that the light of the wavelength of the illumination light beam 19 is reflected, whereas light of the wavelength of the detection light 45 may pass through.

Figure 2:
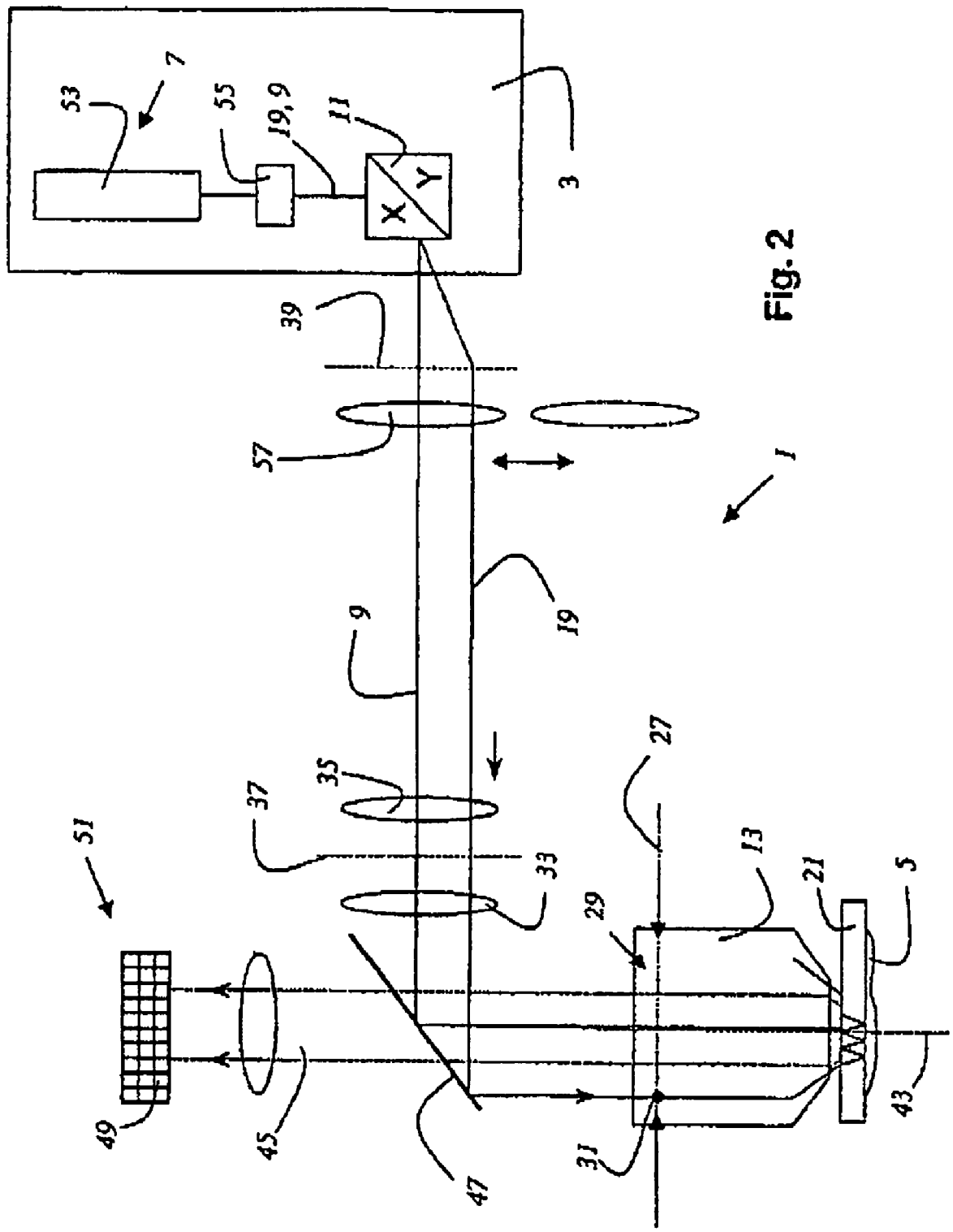
FIG. 2 is a schematic illustration of a first variant of a microscope according to the invention.

FIG. 2 shows a variant in which the optical device 3 for manipulating a sample 5 produces both a manipulation light beam 9 and an illumination light beam 19. The device 3 for manipulating a sample 5 comprises a light source 7, a multi-linear laser 53. from the emission light of which the portions of the desired wavelengths are selectable with an AOTF (acousto-optical tunable filter) 55. The compensating optic 57 is introduced into the beam path of the microscope 1 for the purpose of evanescently illuminating the sample 5. The compensating optic 57 enables the illumination light beam 19 to exhibit a focus 31, which is indicated by a point, in the plane 27 of the objective pupil 29. For the purpose of sample manipulation, the compensating optic 57 is removed from the beam path so that the manipulation light beam 9 is focused on the sample. Both the penetration depth of the illumination light in the sample (by adjusting the position of the focus of die illumination light beam 19 in the plane 27 of the objective pupil 29) and sample manipulation are controlled with the beam deflector 11.

Figure 3:
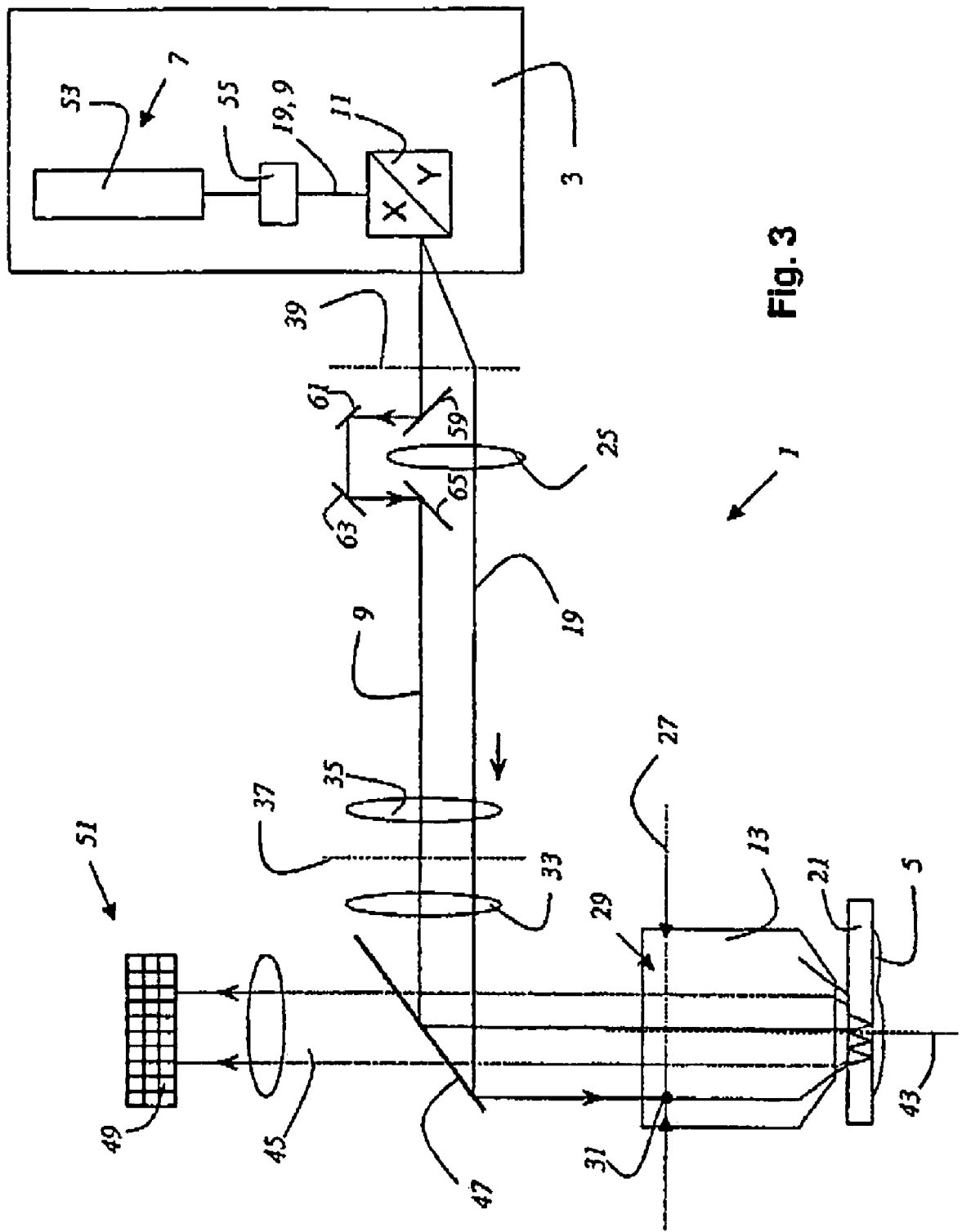
FIG. 3 a is a schematic illustration of a second variant of a microscope according to the invention.

FIG. 3 shows a variant of a microscope 1 according to the invention, in which the illumination light beam 19 passes through the compensating optic 25, which makes it possible for the illumination light beam 19 to exhibit a focus 31, which is indicated by a point, in the plane 27 of the objective pupil 29, while the manipulation light beam 9 is directed at the compensating optic 25 via the first deflecting mirror 59, the second deflecting mirror 61, the third deflecting mirror 63, and the fourth deflecting mirror 65.

Figure 4:
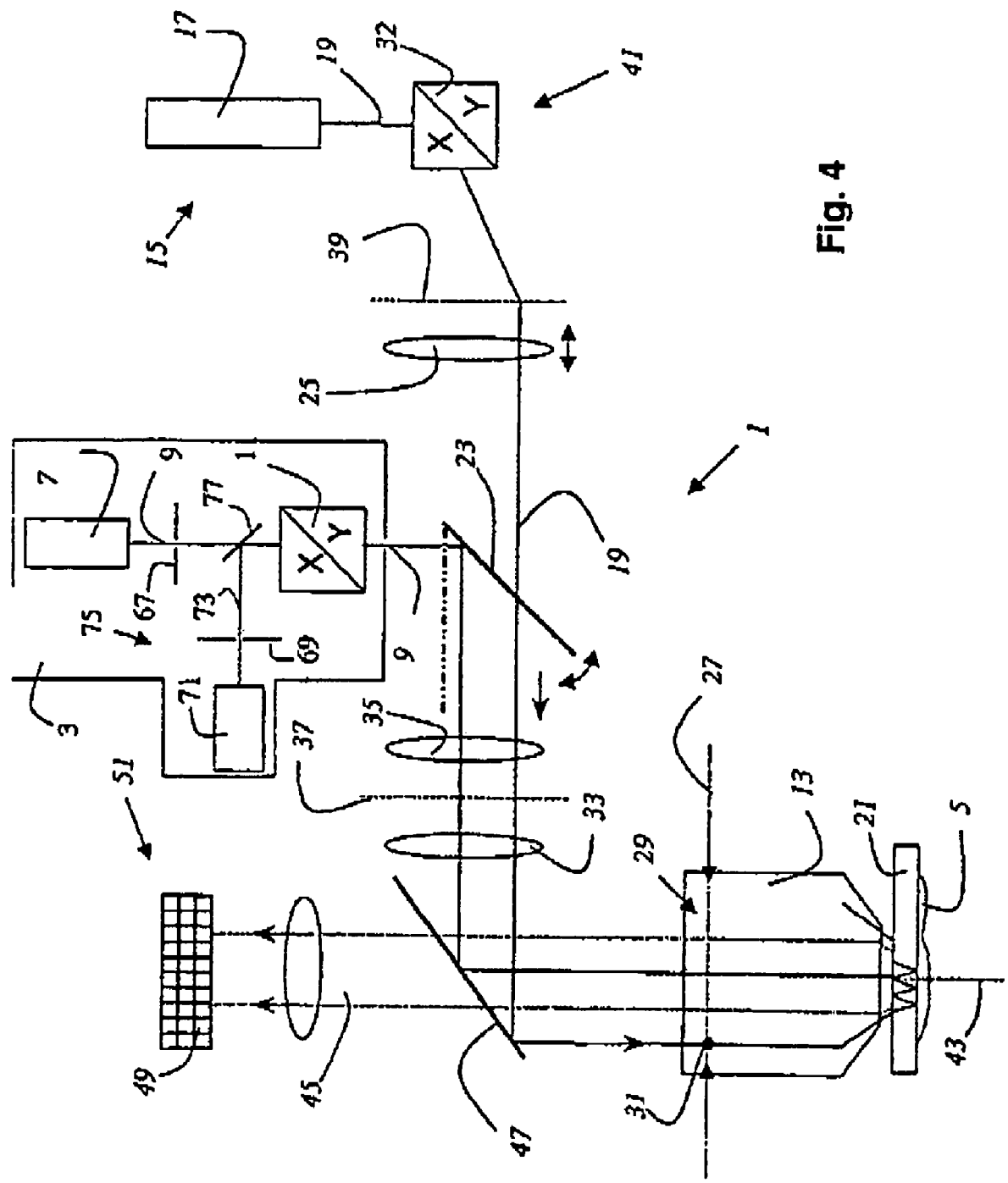
FIG. 4 a is a schematic illustration of a third variant of microscope according to the invention.

FIG. 4 shows a variant of the microscope shown in FIG. 1. In this variant, the optical device 3 for manipulating a sample 5 comprises an illumination pinhole aperture 67, a detection pinhole aperture 69, which is arranged before a multi-band detector 71, as well as a dichroic beam splitter 77 for deflecting the further detection light 73, which issues from the sample, into the detection beam path 75. The microscope shown enables confocal observation of the sample 5, whereby confocal illumination is achieved with the focus of the manipulation light beam 9.

The invention was described in relation to a particular embodiment. However, it is clear that changes and variations may be implemented without abandoning the scope of the following claims.

What is claimed is:

1. A microscope comprising:
   a microscope objective;
   a light source for emitting an illumination laser light beam propagating through the microscopic objective and evanescently illuminating a sample by totally internally reflecting at a sample interface, wherein the microscope objective has a rear pupil plane, and wherein the illumination laser light beam has a focus on the rear pupil plane;
   an optical device for optically manipulating the sample, the optical device comprising a source for generating and emitting a manipulation laser light beam directed to the sample through the objective; and
   a compensating optics disposed in a beam path of the microscope to focus the illumination laser light beam on the rear pupil plane, the compensating optics being removable from the beam path in order to focus the manipulation laser light beam on the sample or
   a compensating optics disposed in a beam path of the microscope to focus the manipulation laser light beam on the sample, the compensating optics being removable from the beam path in order to focus the illumination laser light beam on the rear pupil plane.

2. Microscope according to claim 1, wherein the device for optically manipulating the sample exhibits an adjustable beam deflector.

3. Microscope according to claim 2, wherein the beam deflector comprises at least one galvanometric mirror or at least one rotatable or tiltable prism or at least one wing mirror or a micromirror or an acousto-optical component.

4. Microscope according to claim 2, wherein the beam deflector deflects the manipulation light beam and/or the illumination light beam.

5. Microscope according, to claim 2, wherein a further adjustable beam deflector is provided that deflects the illumination light beam and/or the manipulation light beam.

6. The microscope according to claim 1, wherein the source for generating and emitting the manipulation laser light beam comprises at least one laser.

7. Microscope according to claim 1, wherein the device for optically manipulating the sample exhibits at least one optic for forming or directing the manipulation laser light beam.

8. The microscope according to claim 1, wherein the manipulation light beam focuses on the sample.

9. The microscope according to claim 1, wherein a distance between the focus of the illumination laser light beam and an optical axis of the microscope objective is adjustable.

10. The microscope according to claim 9, further comprising a beam deflector for adjusting distance between the focus of the illumination laser light beam and an optical axis of the microscope objective.

11. The microscope according to claim 1, wherein the microscope is a scanning microscope.

12. The microscope of claim 11, wherein the scanning microscope is a confocal scanning microscope.

13. The microscope according to claim 1, further comprising a detector for capturing detection light exiting from the sample through the objective.

14. The microscope according to claim 1, wherein the manipulation light beam is used to release a marker (caged compound release), for bleaching, for activating a marker, for FRAP testing (fluorescence recovery after photobleaching), for FRET testing (Förster transfer), or for microdissection.

* * * * *